United States Patent [19]

Moore

[11] Patent Number: 4,512,669
[45] Date of Patent: Apr. 23, 1985

[54] ROCK BIT BEARING PRESSURE EQUALIZATION SYSTEM

[75] Inventor: Leslie B. Moore, Red Oak, Tex.

[73] Assignee: Dresser Industries, Inc., Dallas, Tex.

[21] Appl. No.: 143,394

[22] Filed: Apr. 24, 1980

[51] Int. Cl.³ .............................................. F16C 33/10
[52] U.S. Cl. .................................................... 384/93
[58] Field of Search .................... 308/8.2; 29/149.5 R; 175/228, 227, 229, 371; 384/93

[56] References Cited

U.S. PATENT DOCUMENTS

| | | | |
|---|---|---|---|
| 3,017,937 | 1/1962 | Bobo | 175/228 |
| 3,029,881 | 4/1962 | Swart | 175/228 |
| 3,048,230 | 8/1962 | Angel | 175/228 |
| 3,675,729 | 7/1972 | Neilson | 175/228 |
| 3,839,774 | 10/1974 | Jackson | 29/149.5 R |
| 3,850,256 | 11/1974 | McQueen | 175/228 |
| 4,199,856 | 4/1980 | Farrow et al. | 308/8.2 |

*Primary Examiner*—Lenard A. Footland
*Attorney, Agent, or Firm*—Fred A. Winans

[57] ABSTRACT

A lubrication system for a multiple segment rotary rock bit, with each segment having lubrication supply means to the cutter bearing structure associated therewith and whereby each supply means is in lubricant flow communication with the lubricant supply means of the remaining segments so that the internal pressure of the lubricant system is substantially equal in each segment.

1 Claim, 3 Drawing Figures

ROCK BIT BEARING PRESSURE EQUALIZATION SYSTEM

BACKGROUND OF THE INVENTION

This invention relates generally to sealed bearing rotary bits and, more particularly, to such bits having multiple sealed bearings and a lubrication system common to each bearing.

DESCRIPTION OF THE PRIOR ART

The most common rotary rock bit presently commercially available is known as a three cone bit. Such configuration is typified by a rock bit assembly generally comprising three separate similar segments, each having an upper dome portion and a downwardly extending arm, terminating in an inwardly direction bearing pin on which is rotatably mounted a conical cutter.

Each segment also contains a separate independent lubrication system for lubricating the bearing structure between the bearing pin and the rotatable cone. This system generally includes a lubricant filled reservoir having a flexible diaphragm responsive to ambient pressure, external to the bit, and passage means communicating the reservoir with the bearing structure. A bearing seal ring between the cone and the bearing pin provides a seal at the interface of the bearing pin and rotary cone exposed to the external conditions. Thus, as the external pressure increases, the increased pressure is transmitted to the internal lubricant through the flexible diaphragm to maintain a balanced pressure on both sides, (i.e. internal and external) of the seal.

It has been observed however in such systems that for various reasons such as thermal expansion of the lubricant, degradation and gasification of the lubricant, and drilling fluid seepage into the lubricant past the seals, the closed lubricant system of each segment could become completely filled with fluid and the internal pressure therein would become greater than the external pressure. Under such condition, the diaphragm could rupture, through a vent opening that communicated the diaphragm to the external pressure, or the seal ring could be forced or extruded out of its sealing position whereupon, under either of these two situations occurring, the lubrication system would no longer be sealed and the lubricant therein would be displaced by the drilling fluid. This would result in the bearing structure being deprived of effective lubrication causing it to fail prematurely.

It was quite often found that bits, as above described, would have one bearing of the multiple segment bit fail in a manner which could be attributed to the above described conditions, whereas the remaining bearings and lubrication systems would be unaffected and still operable. However, because of the failure of the one, the entire bit would fail, or, even worse, the bit would continue to be run with the unlubricated pin and cone being stressed to a condition whereupon it would fracture, leaving bit parts or "junk" in the hole.

SUMMARY OF THE PRESENT INVENTION

The present invention provides a multiple segment rotary bit with each segment having an internal lubrication system and with the lubricant passages of each segment interconnected to the lubricant system of the other segments so that, should the internal lubricant of any one segment encounter conditions which would otherwise increase the internal pressure within that segment and cause a failure, the increased pressure is communicated and shared equally by all sealed bearing lubrication systems of the bit. This provides a sealed lubrication system with each segment having an additional volume in its lubrication system into which the expanded volume or increased pressure of that segment can be distributed thereby effectively lengthening the time before any one lubrication system is breached so that the total useful life of the bit is thereby increased.

Also, if the lubrication system of one segment encounters conditions that cause the volume to increase to a point where the pressure in the entire system causes failure, it is likely that more than one pin/cutter bearing structure would fail so that it would be a sufficiently noticeable change in the drilling effectiveness that the bit would be pulled before any breakage occurred.

DESCRIPTION OF THE PREFERRED EMBODIMENT

Figure 2:
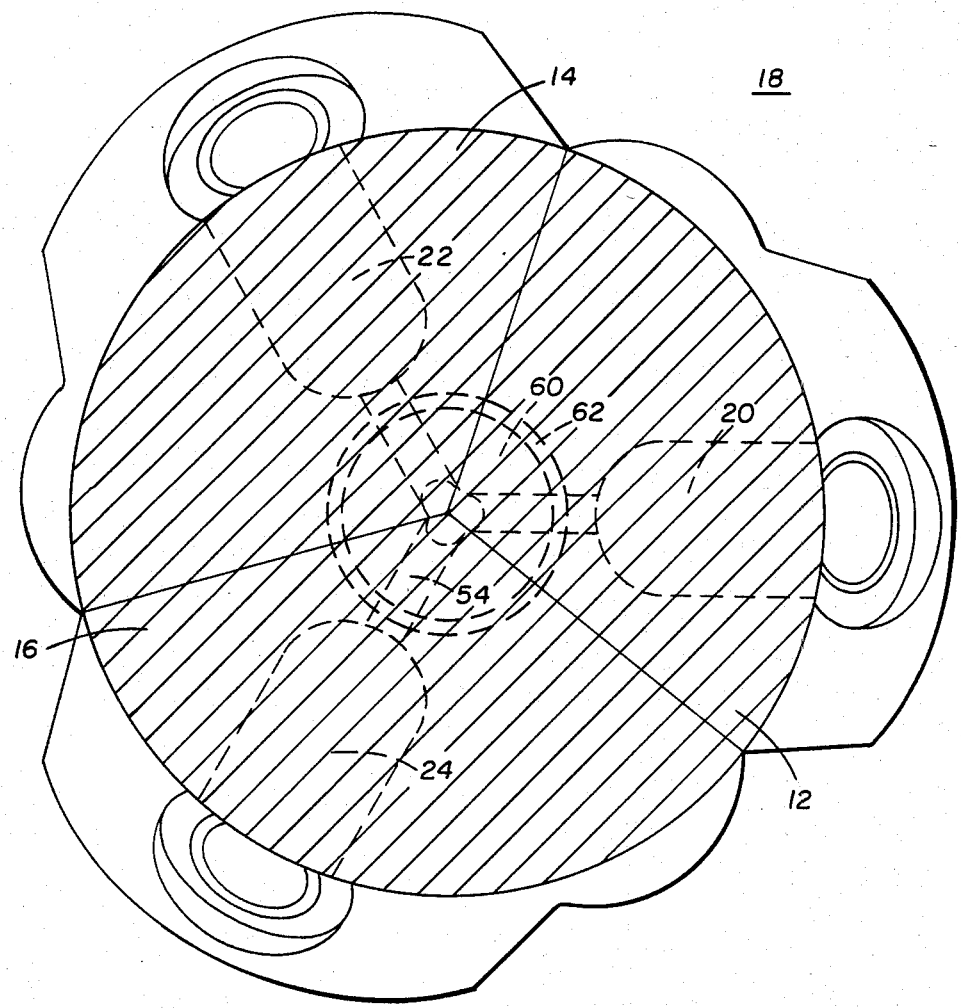
FIG. 2 is a cross-sectional plan view of the bit of FIG. 1.

The invention, in its presently preferred form, is in the embodiment of a sealed bearing three-cone rotary rock bit of generally well known configuration. Such a bit is more fully shown and described in commonly owned U.S. Pat. No. 3,839,774 which is herein incorporated by reference. As seen in the referenced patent, each bit includes three downwardly extending arms, each rotatably supporting a cone cutter adjacent the terminal end and with each arm having, as shown in FIG. 2 thereof, a separate sealed lubrication system. This lubrication system includes a flexible diaphragm for maintaining the internal pressure of the system generally equal to the external pressure of the drilling fluid. However, as the lubricant volume in any one segment expanded, the volume to accommodate this expansion was limited to the outward flexure of the diaphragm. Further deterioration of the lubricant or other conditions which caused an internal pressure increase could not be accommodated by the system and ultimately resulted in the diaphragm either rupturing or the seal ring failing as previously explained.

Figure 1:
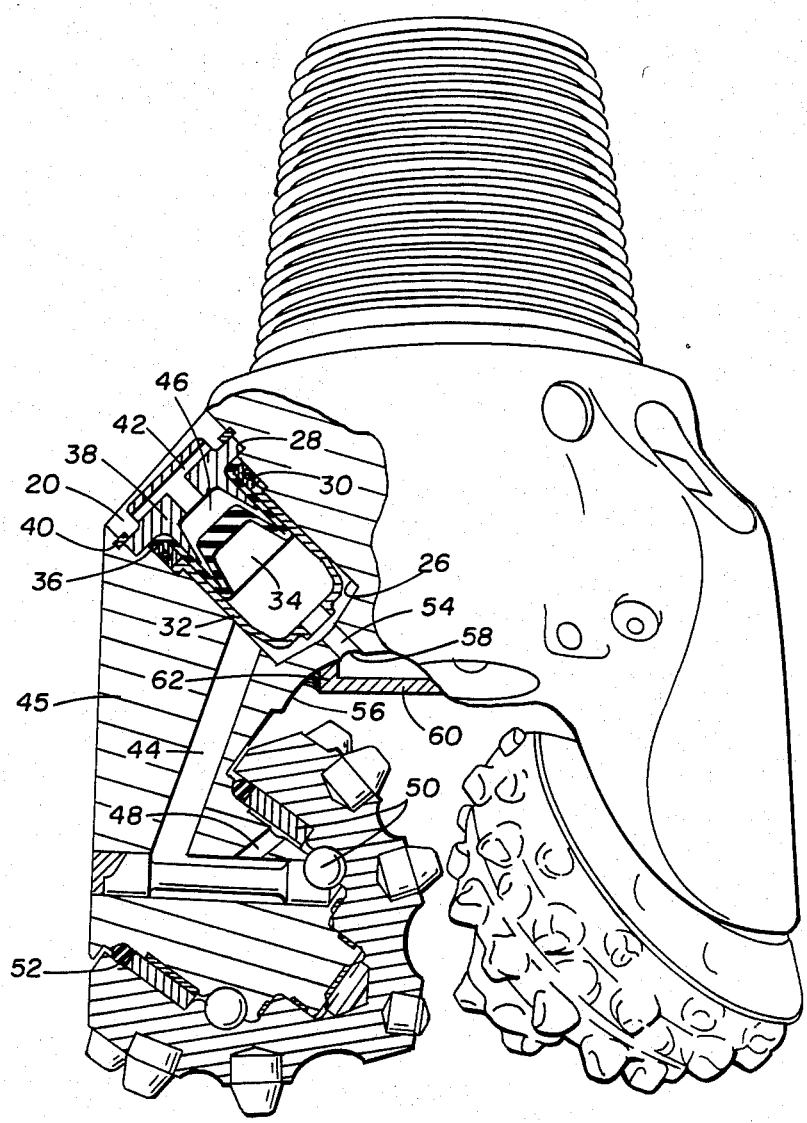
FIG. 1 is a cross-sectional elevational view of a portion of a multiple segment rotary bit according to the present invention.

Referring now to FIGS. 1 and 2 herein and which generally show that portion of a rock bit in the dome area only, it is seen that the present invention utilizes substantially the same lubrication system of the referenced patent. Thus, each segment 12, 14 and 16 of the bit 18 includes a reservoir 20, 22 and 24 respectively. The reservoirs are similar to the lubricant reservoir of the referenced patent, with each reservoir (which is typified by reservoir 20 in FIG. 1) seen to include a radially inwardly downwardly projecting bore 26 having a stepped, countersunk opening 28 providing a first seat for engaging the flange 30 of an internal cup 32 generally conforming to the bore configuration.

A flexible diaphragm 34 has a sealing flange 36 captured between the flange 30 and a cap member 38 retained in the opening by a snap ring 40. The cap has a vent passage 42 therethrough for communicating external pressure (i.e. the pressure of the drilling fluid on the external face of the bit) to the lubricant contained in the cup. The cup 32 has an opening for lubricant communication from the bore to the lubricant conduit 44 extending from the bore down the arm 45 to lubricant distribution passages 48 leading to the bearing structure 50.

During assembly, the lubrication system, including the bearings, is substantially filled with lubricant except for the volume between the diaphragm 34 and the cap member 38, with this latter volume 46 being available to accommodate expansion or increased volume of the lubricant. Heretofore, once such expansion volume became filled in each individual segment, the internal pressure of that segment may increase to such an amount that either the diaphragm is ruptured at the vent opening or the O-ring 52 is extruded outwardly, either of which breached the sealed lubrication system so that lubricant is lost and the associated bearing ultimately ruined.

Still referring to FIGS. 1 and 2, the present invention further includes a reservoir conduit 54 extending from the bore 26 of each inwardly to open at the inner surface of the internal bit dome 56 as at 58. A cuplike reservoir member 60 having a bottom with an upstanding peripheral lip 62 is sealingly attached as by welding, to the dome surface 56 to enclose all the openings 54 therein. Thus, reservoir 60 is thereby made common to each separate lubrication system of each segment which in turn is thus in fluid flow communication to the others through such reservoir.

In this preferred embodiment, the reservoir 60 is also filled with lubricant. In practice, as each separate pin/cone bearing assembly encounters conditions which cause expansion of the lubricant volume associated therewith (which invariably occurs earlier in one such pin/cone assembly than in the others) the common communication between systems permits not only the expansion volume 46 of this one segment to be available to accommodate the expansion without pressure increase, but also permits the expanded lubricant to flow into the like expansion volumes 46 in the other or remaining segments. Thus, an expansion that would have previously caused an internal pressure that would have breached the sealed lubricant system of one segment is accommodated by the lubrication systems of the remaining segments which in turn extends the elapsed time between the inception of the condition which causes the increased expansion and pressure buildup and the time such volumes 46 are filled and the internal pressure of the interconnected lubrication systems has increased to a point where rupture of the diaphragm or extrusion of the O-ring occurs. And, as is appreciated in the art, any such increase in the effective drilling time is extremely important considering the "trip" time required to change bits at the depth to which holes are now commonly being drilled.

Also, however of secondary importance, the above configuration, by permitting an equalization of pressures on the lubrication system throughout the complete bit, (i.e. all three pin/cone bearing structures) exposes each O-ring and each diaphragm to the same pressure such that, as the pressure increases to a value to precipitate an extruded or rupture condition, it will likely occur in more than one segment within a short time between occurrences. This will result in rapid deterioration of drilling effectiveness such that it will be readily noticed and can be pulled whole from the borehole prior to it being run to a breakdown condition which would leave "junk" in the hole.

It is obvious that the described embodiment is only one of many variations for providing fluid flow communication among the heretofore separately sealed lubricant systems of each segment. Another system is schematically shown with reference to FIG. 3 wherein the common reservoir 60 is eliminated in favor of multiple interconnecting conduits 64 in alignment between segments 12, 14, and 16 and providing fluid flow communication between each reservoir 20, 22, and 24.

Figure 3:
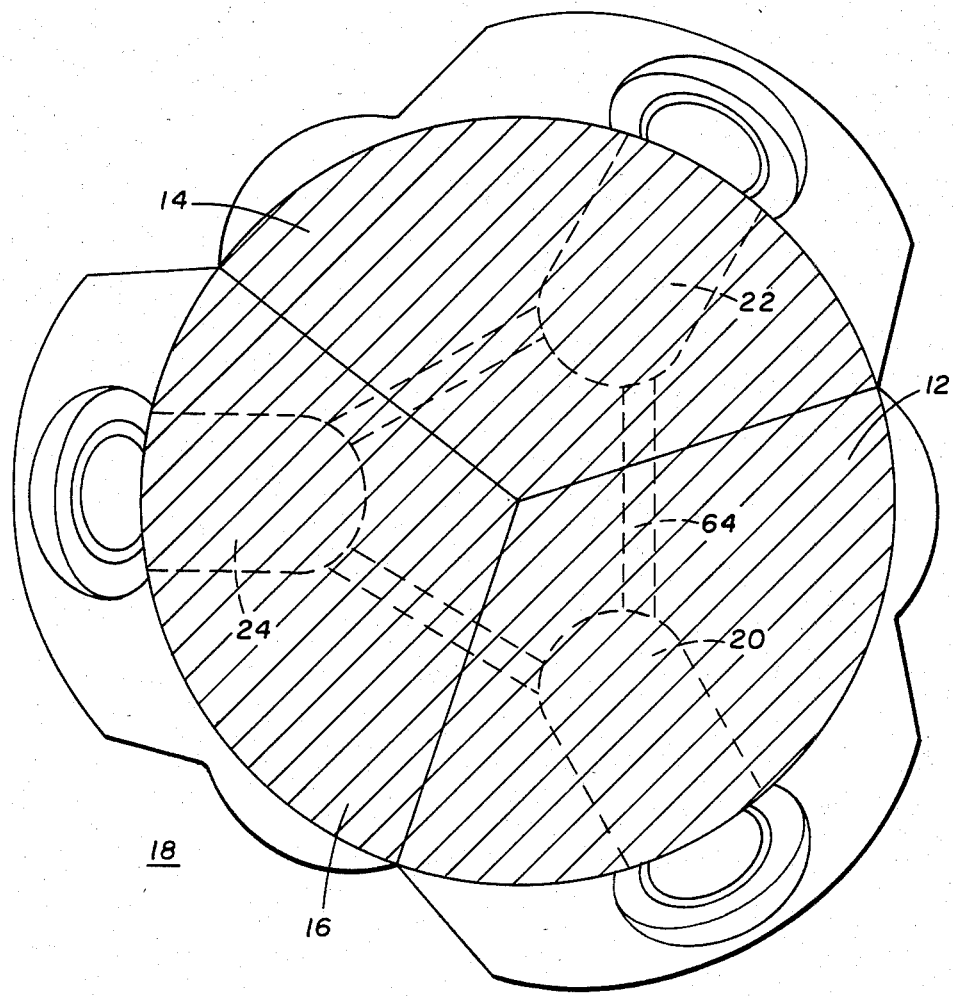
FIG. 3 is a view schematically illustrating another embodiment of the invention.

It is also apparent, that, in the preferred embodiment of FIGS. 1 and 2 and the schematic embodiment of FIG. 3, the multiple diaphragms 34 (i.e. one per segment) will provide multiple pressure compensators highly responsive to external pressure surges. Heretofore, such external pressure surges on any one diaphragm resulted in the internal pressure on the bearing seal being increased without necessarily being balanced by a corresponding increase in pressure on the external side. With the above described preferred embodiment, such transitory pressure surges on any one diaphragm can be accommodated by the inherent flexibility of the remaining diaphragms to minimize pressure differentials across the bearing seal.

As a further benefit, the assembly of the bit 18 of the present invention permits filling the lubrication system, including the reservoirs and passages of each separate segment, all at once and generally equally distributing the lubricant during the single filling operation.

I claim as my invention:

1. An improved multiple segment sealed bearing rotary bit, wherein each segment includes: bearing structure between a stationary bearing pin and a rotatably mounted cutter element thereon and wherein each bearing structure has a separate sealed lubricant system for providing lubrication to the respective bearing structure, said lubricant system comprising:

a seal ring in sealing engagement between each pin and cutter element for substantially sealing said bearing structure from external matter;

sealed lubricant reservoir means in each segment and containing lubricant;

a flexible diaphragm means in sealing relationship with each said reservoir means and having one face thereof exposed to ambient conditions external to said bit, said system providing a generally closed lubricant expansion volume whereby internal pressure, as by expansion of said lubricant forces said seal ring into a non-sealing position or ruptures said diaphragm and, wherein the improvement comprises:

means providing fluid flow communication between each separate lubricant system of each segment whereby an expanded volume of lubricant in the system of one segment can be accommodated by the available volume in the system of any other segment to provide substantially equal lubricant pressure on the bearing structure of each segment and wherein said means providing fluid flow communication includes passages in each segment in alignment with like passages of each adjacent segment and wherein said aligned passages provide fluid flow communication between said lubricant reservoir means of said lubricant systems of adjacent segments.

* * * * *